United States Patent [19]

Hicks et al.

[11] 4,111,372
[45] Sep. 5, 1978

[54] FOOD PROCESSOR INTERLOCK

[75] Inventors: William R. Hicks, Spencerport; Richard S. Woodard, Kent, both of N.Y.

[73] Assignee: General Electric Company, Bridgeport, Conn.

[21] Appl. No.: 790,271

[22] Filed: Apr. 25, 1977

[51] Int. Cl.$^2$ .............................................. B02C 18/12
[52] U.S. Cl. ................................. 241/37.5; 241/282.1
[58] Field of Search ................ 241/36, 37.5, 199.12, 241/282.1, 282.2

[56] References Cited

U.S. PATENT DOCUMENTS

| | | | |
|---|---|---|---|
| 2,982,483 | 5/1961 | Heinemans | 241/36 X |
| 3,434,518 | 3/1969 | Motis | 241/199.12 |
| 3,493,022 | 2/1970 | Mantelet | 241/199.12 |
| 3,892,365 | 7/1975 | Verdun | 241/282.1 X |

*Primary Examiner*—Howard N. Goldberg

*Attorney, Agent, or Firm*—John F. Cullen; George R. Powers; Leonard J. Platt

[57] ABSTRACT

In a food processor with a power base having a bowl supporting portion and driven shaft extending vertically therefrom, an adjacent upstanding motor-containing housing of bowl height with a bowl on the portion containing a cutter on the shaft and an internal switch controlled motor energizing circuit, there is provided an improved interlock system comprising a bowl lid with structure operatively securing the lid to the bowl opposite the motor housing when the lid is rotated axially of the shaft toward the housing. A housing opening at lid height is provided opposite the securing structure and a probe-carrying arm on the lid is movable into the opening on lid rotation. Releasable arm locking/switch activating structure is provided internally of the opening that includes biased slider mechanism and an external release knob movable to overcome the bias whereby the circuit is deenergized by opening the internal switch on knob actuation so that the processor is rendered inoperative whenever the lid is removed from the bowl.

5 Claims, 4 Drawing Figures

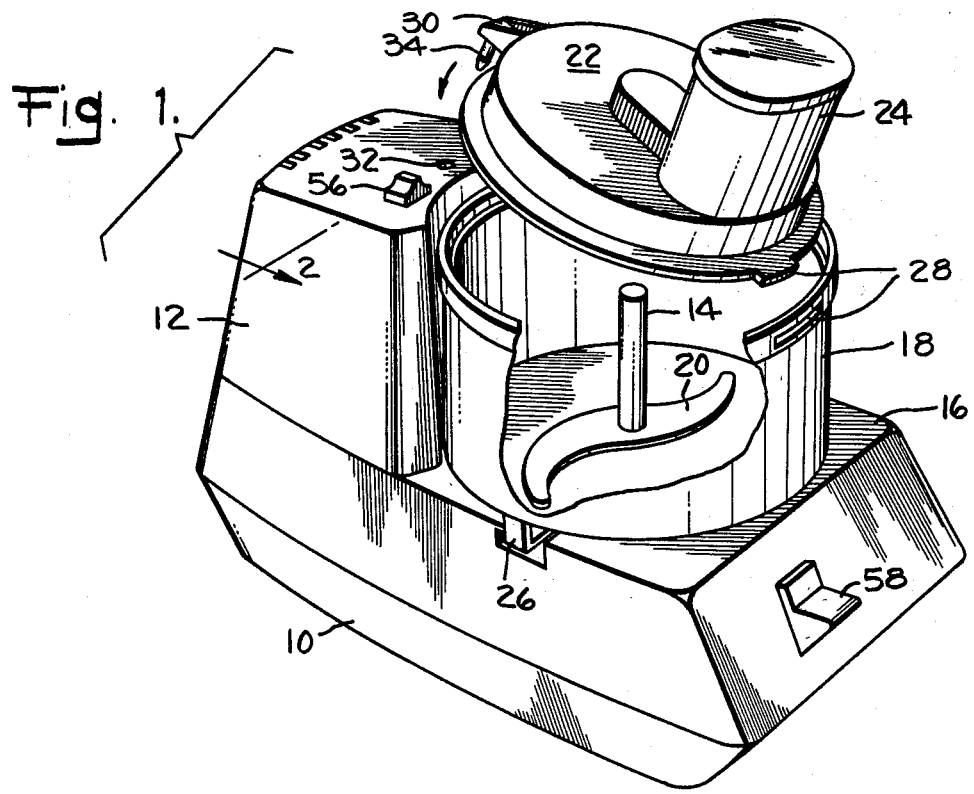
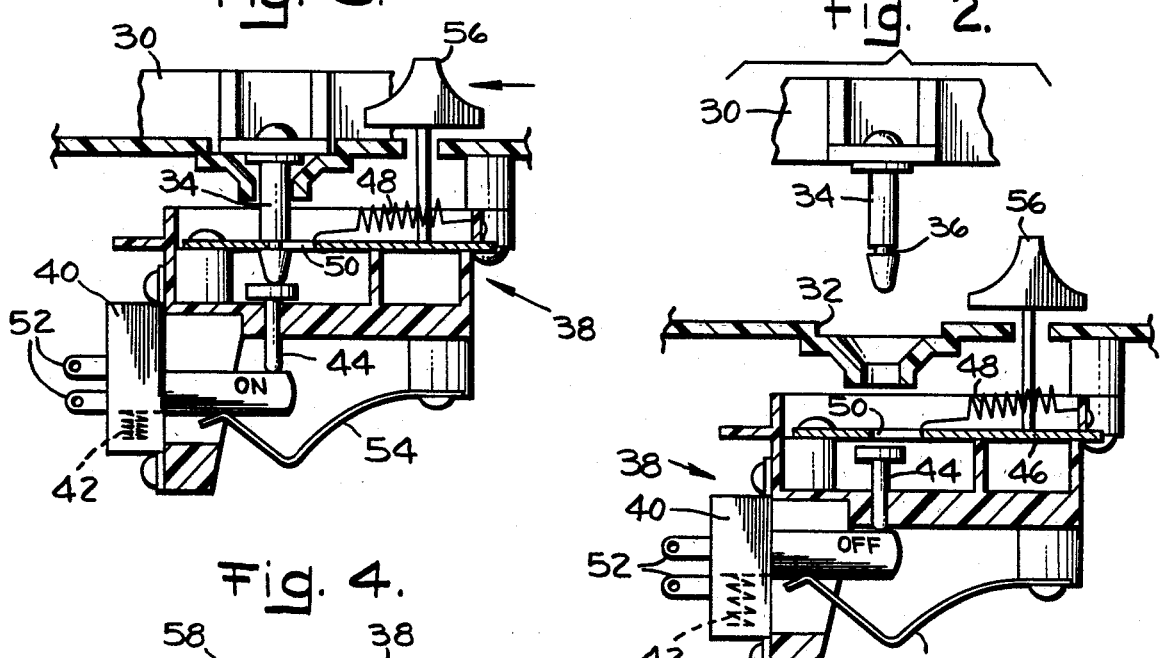
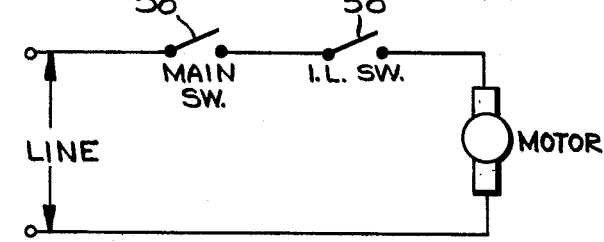

FOOD PROCESSOR INTERLOCK

BACKGROUND OF THE INVENTION

1. Field of the Invention

The invention relates to a food processor having a power base with a bowl supporting portion alongside with a vertically driven shaft operable in a bowl thereon. Structure is provided that forms a safety interlock between a bowl lid and power supply circuit for the processor such that assembly of the bowl lid closes a switch which permits the unit to be turned on and removal of the lid opens the switch deenergizing the circuit even if the main switch has not been shut off.

2. Description of the Prior Art

It is known to use food processors, a device fitting in the speed range between blenders and mixers, as a multipurpose kitchen apparatus that uses multiple interchangeable rotary tools such as blades, knives, cutting and rasping discs, and other tools for performing different operations on food as blending, mixing, grating, grinding, chopping, whipping and other operations in a short time. Generally, processors have been notable in the gourmet field but are being expanded to become a commonly used kitchen appliance. They usually comprise a power base with a bowl supporting portion and a vertically driven shaft that carries the cutters or other tools within the bowl. A lid that is interlocked with the motor circuit, and which usually contains a safety chute for introducing food to the bowl, inactivates the processor when the lid is removed and the sharp knives are exposed. Some devices are strictly food processors as in U.S. Pat. No. 3,892,365. Other devices may be quite flexible by providing means whereby the same basic power unit forms a food processing appliance that may operate in many speed ranges from blenders to mixers depending on what bowl is selected which automatically provides the correct shaft speed for the operation desired. Such a device is shown in co-pending application 751,042 filed Dec. 16, 1976 and of common assignment. An object of the present invention is to provide a food processor of the general known type with a different safety interlock system between the bowl lid and the motor energizing circuit so that assembly of the lid closes a switch that energizes the circuit and removal of the lid deactivates the circuit even if the main switch has not been shut off.

Another object is to provide such a processor wherein the interlock mechanism also locks the lid in position and upon actuating a release knob, automatically opens the lid after first deenergizing the circuit to provide for safe lid removal.

A further object is to provide such an appliance wherein the power unit and bowl support are side-by-side to reduce the overall height of the appliance.

SUMMARY OF THE INVENTION

Briefly described, the invention is directed to a food processor having a power base with a bowl-supporting portion and driven shaft extending vertically therefrom with an adjacent motor-containing housing of bowl height and with a bowl on the bowl-supporting portion and containing a cutter on the driven shaft and with an internal switch in the housing controlling the motor energizing circuit. To this general combination there is provided an improved interlock mechanism comprising a bowl lid and means lockingly securing the lid to the bowl opposite the motor housing when the lid is rotated axially of the shaft toward the housing. An opening is provided in the housing at lid height opposite the securing means and an arm on the lid carrying a downward probe is movable from without into the opening when the lid is rotated to latch into the housing. The housing opening contains an internal switch means with an on/off button to be operable by the probe and a biased slider mechanism is provided between the probe and the button to latch the probe and lock the lid and to simultaneously energize the circuit. An external release knob is provided on the housing to move the slider whereupon a spring bias lifts the lid in a snapping action into open position while automatically and simultaneously deenergizing the circuit whereupon the lid may be removed for access to the bowl. The arrangement is such that the safety interlock is operable whether or not the main switch is on or off. Thus, the main object of the invention is to provide a food processor with a specific interlock arrangement whereby release of the bowl lid lifts it and automatically shuts off the power even if the main switch has not been shut off and additionally, the bowl lid is mechanically held in place by merely pushing it down to simultaneously latch the lid in place and activate the circuit for operating the processor.

BRIEF DESCRIPTION OF THE DRAWING

FIG. 1 is a perspective view partially in section and with the bowl lid open;

FIG. 2 is a partial view taken in the direction of line 2 of FIG. 1 showing the internal locking and switch means with the lid open;

FIG. 3 is a view similar to FIG. 2 showing the closed lid in locked position, and FIG. 4 is a schematic diagram of the energizing circuit.

Referring to FIG. 1 there is shown a food processing appliance including a basic blender-type power base 10 which is preferably L-shaped having an upstanding motor-containing housing unit 12 which has a suitable motor such as a low cost series motor which drives a power shaft 14 by a suitable linkage between the power unit and shaft 14 as well known in the art. Disposed on the bowl supporting portion 16 of the base is a removable bowl 18 with a cutting mechanism on shaft 14 and cutters 20 therein. As shown, the bowl 18 is a relatively large bowl having a lid 22 with an integral chute 24 by which food is introduced to the bowl. The bowl may be locked in position on the base by suitable lugs 26 by rotating it into position on supporting portion 16. Thus, the bowl and cutting mechanism are supported on portion 16 with the cutters being driven from motor unit 12 in the base 10 generally at a given speed. In accordance with the invention, the lid 22 is secured to bowl 18 by a novel interlock so that the motor circuit is deenergized when the lid is opened as a safety feature. A similar device with the interlock energized by rotating the lid on the top of its bowl, is shown and described in U.S. Pat. No. 3,892,365 noted above.

In order to provide a low profile processor with an improved interlock mechanism to lock the lid and energize the motor circuit and which can be controlled by an external release knob to automatically deenergize the circuit and lift the lid for removal, and referring to FIG. 1 the lid is provided with means to operatively secure the lid to the bowl and located opposite the motor housing 12. Such means is any suitable arrangement such as the common mortise and tenon type shown which must be engaged before the lid can be secured to bowl 18. For closing the lid in position, it is provided with an arm 30 directly opposite means 28 with the lid being rotatable in the direction of the arrow or generally axially of shaft 14 toward housing 12 when securing means 28 is engaged. A housing opening 32 is disposed opposite the securing means 28 in the top of housing 12 substantiallly at bowl or lid height as shown in FIG. 1. In order to prevent any tampering and to locate it internally of the housing and out of sight, there is provided a main portion of the interlock forming an internal releasable arm locking and switch activating means as shown in FIGS. 2 and 3. For operation of the internal means, arm 30 is provided with a downwardly directed coned probe 34 having a groove 36 with the probe adapted to enter housing opening 32 from without in a smooth aligned fit as shown in FIG. 3 and be latched therein.

For performing the dual function of latching the lid in closed position and simultaneously activating the motor circuit, the internal locking/switch mechanism generally indicated at 38 has an internal switch 40 that preferably has a built in spring 42 biasing it to the upper position as shown in FIG. 2. Forming part of the switch for activation by probe 34 is a suitable button 44 that is aligned with the probe to form an on/off button or mechanism to operate switch 40 with the internal switch biased to the up or "off" position when probe 34 is out of the opening as shown in FIG. 2. This is the position wherein lid 22 may be removed for access to the bowl. For holding the lid and simultaneously activating the circuit, when the lid is positively latched, a slider 46 is provided biased to the right by suitable spring 48 and contains a central aperture 50 to accommodate probe 34. As seen in FIG. 2, when the lid is rotated so probe 34 enters from the outside of the housing into opening 32, the cone tip will ride slider 46 to the left and the button 44 is operated down to activate switch 40 into the "on" position shown in FIG. 3. Switch 40 is connected to the line by terminals 52. In this "on" position, slider 46 biased by spring 48 will catch the groove 36 in the probe and mechanically lock or secure the lid closed while simultaneously energizing the circuit. Normally switch button 44 is biased to the upper "off" position of FIG. 2 by internal switch spring 42. In order to protect against the spring weakening or breaking, an additional spring 54 is provided to bias the button into its up or normally circuit open position. For releasing the lid, an external release knob means 56 is connected to the slider 46 to move it in the direction of the arrow of FIG. 3 whereupon springs 42 and 54 lift the probe and connected lid up in a snapping action and out of the opening when aperture 50 has been released from groove 36. At the same time, the switch is turned to the "off" position so the release of the probe by knob 56 automatically deenergizes the circuit and simultaneously lifts the lid into the position shown in FIGS. 1 and 2 whereupon it can be removed for access to the bowl.

Since it is desired to operate the processor by the main external switch 58 for continuous or intermittent "on" position, both the main switch 58 and internal probe actuated switch 38 are connectd in series as shown in FIG. 4 for further safety reasons.

Thus, the invention provides a low profile processor with the side-by-side arrangement and the device is no higher than the bowl in which the food is processed. Specific interlock mechanism ensures that the device cannot be operated unless the bowl lid is securely in place and this cannot occur unless the securing means 28 is properly in position so that probe will enter the internal latching switching mechanism 38 which performs the dual function of positively latching the lid in position by merely pushing it down until it clicks and simultaneously activate the circuit. Then, if the main switch is closed, the device will operate. With the series connection of the switches, if the main switch 58 is not closed the device will not operate. If the main switch is closed and the lid is not securely latched in position, it will not operate. Finally, when the release knob 56 is actuated it simultaneously deenergizes the circuit and automatically snaps the lid up to partially open position so that it can be removed from the bowl.

While we have hereinbefore shown a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

We claim:

1. In a food processor having a power base with a bowl-supporting portion and driven shaft extending vertically therefrom, an adjacent upstanding motor-containing housing, a bowl on said portion containing a cutter on said shaft, and an internal switch-controlled motor energizing circuit, an improved interlock comprising,
    a bowl lid,
    means operatively securing said lid to the bowl opposite the motor housing on lid rotation axially of the shaft toward the housing,
    a top housing opening at lid height opposite the securing means,
    an arm on the lid movable from without into the opening on lid rotation,
    releasable arm locking/switch activating means internally of said opening
    whereby the circuit is deenergized by opening the internal switch and the processor rendered inoperative on lid removal.

2. Apparatus as described in claim 1 wherein the motor housing is substantially bowl height and downward directed probe means is provided on said lid arm to enter from without into said opening for switch activation and lid locking.

3. Apparatus as described in claim 2 wherein the internal switch means in said housing has an on/off button aligned with said probe for actuation thereby,
    a biased slider mechanism between said probe and button movable by the probe to latch said probe thereon to lock the lid and energize the circuit and external release knob means connected to move said slider to overcome the biase and permit withdrawal of said probe from within the housing releasing the lid and deenergizing the circuit for lid removal.

4. Apparatus as described in claim 3 wherein said switch button is spring-biased to an up "off" position whereby release of said probe by said knob automatically deenergizes the circuit and lifts said lid.

5. Apparatus as described in claim 4 wherein said motor energizing circuit includes a main external switch in series with said internal probe-actuated switch.

* * * * *